Sept. 16, 1924.

H. M. AINSWORTH

GENERATOR DRIVE

Filed Sept. 20, 1921

Inventor
Henry M. Ainsworth
by Wilkinson & Giusta
Attorneys.

Sept. 16, 1924.  H. M. AINSWORTH  1,508,945
GENERATOR DRIVE
Filed Sept. 20, 1921   3 Sheets-Sheet 3

Inventor
Henry M. Ainsworth
by Wilkinson & Giusta
Attorneys.

Patented Sept. 16, 1924.

1,508,945

UNITED STATES PATENT OFFICE.

HENRY MANN AINSWORTH, OF COVENTRY, ENGLAND, ASSIGNOR TO SOCIÉTÉ ANONYME DES ANCIENS ETABLISSEMENTS HOTCHKISS ET COMPAGNIE, OF ST. DENIS, SEINE, FRANCE.

GENERATOR DRIVE.

Application filed September 20, 1921. Serial No. 501,977.

*To all whom it may concern:*

Be it known that I, HENRY MANN AINSWORTH, a subject of the King of Great Britain, residing at 90 Gosford Street, Coventry, Great Britain, have invented new and useful Improvements in Generator Drives, of which the following is a specification.

This invention relates to the mounting of a combined dynamo and starting motor on motor vehicles, and it has for its object to obtain certain advantages, more fully specified later, in a simple manner.

Other objects of the invention are to provide a simple and compact driving structure between the driven member of the clutch and dynamo electric machine adapted to function as a motor or a generator in which the structure will be housed in an extension casing with the fly wheel and clutch and will be constantly and positively driven whenever the driving member of the clutch is in motion.

The instrument drives on to the driving member of the clutch and its inertia does not affect that of the driven member of the clutch, and therefore does not affect gear changing, for which purpose the inertia of the driven member of the clutch should be as small as possible.

In the accompanying drawings, which show the preferred method of applying the invention, Figure 1 is a perspective view showing part of an engine-clutch-gear-box unit with a dynamo electric machine in position.

Like letters indicate like parts throughout the drawings.

Figure 1:
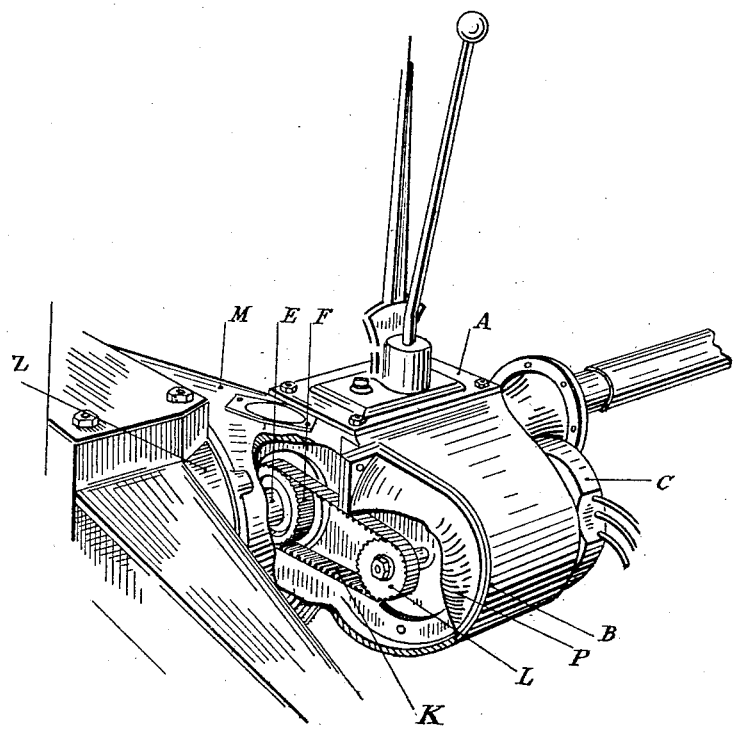
Figure 2:
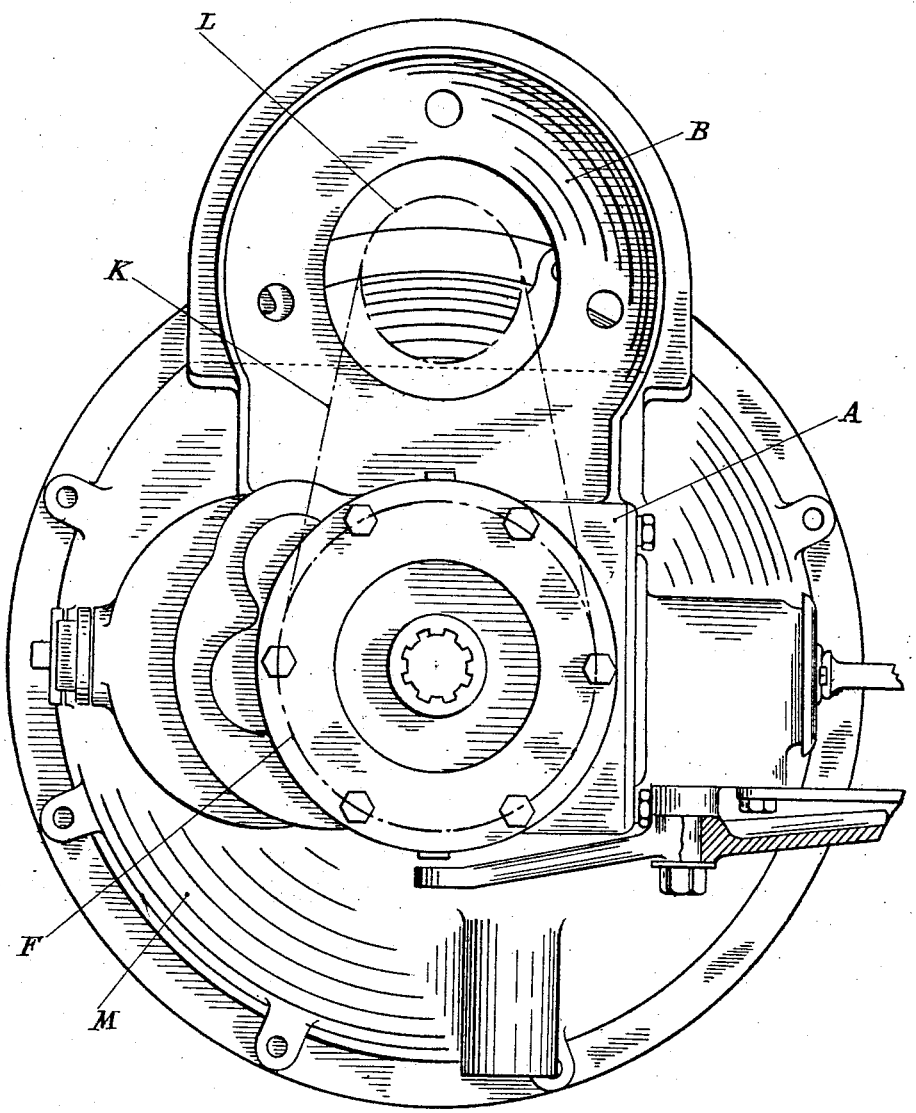
Figure 2 is a rear view thereof with the dynamo electric machine removed.
Figure 3:
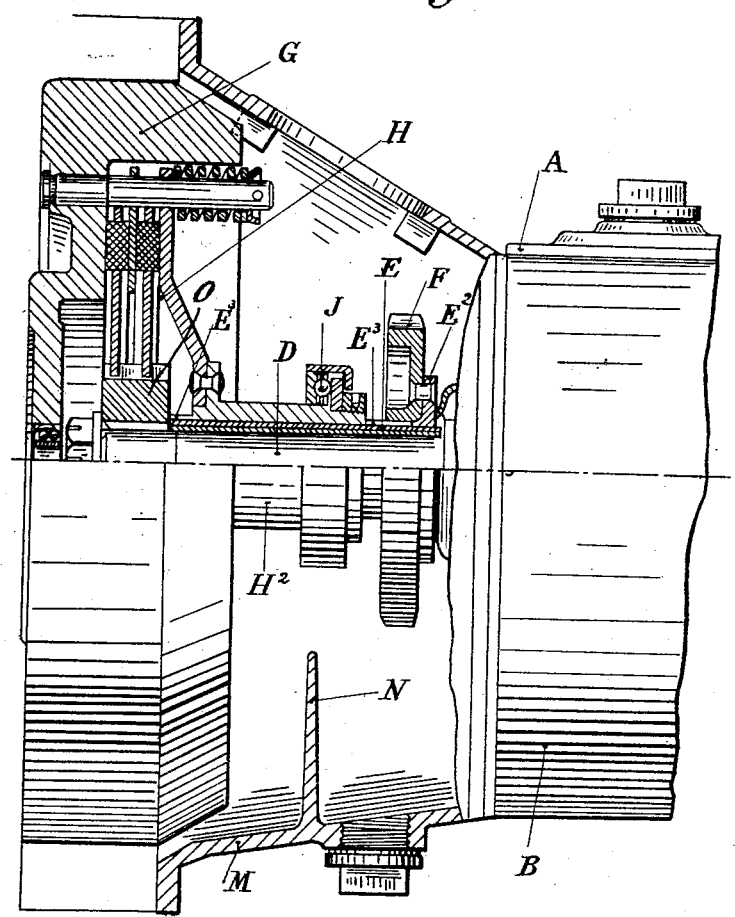
Figure 3 is a longitudinal section showing part of the unit.

Referring more particularly to the drawings A designates the casing which houses the transmission of the vehicle. Forwardly of this transmission casing is the clutch housing M having therein the baffle N to retain lubricant in the space through which the chain K is adapted to travel. This chain K is engaged about the sprocket wheels F and L shown in Figure 1. The sprocket wheel L is upon the shaft of an electrical machine C which is adapted to function both as a generator and as a motor. The electrical machine is held by a bracket B to one side of the gear box or transmission casing A.

In the clutch housing M is the usual clutch shaft D. This clutch shaft is provided with the usual longitudinal sliding hub $H^2$. The letter $j$ indicates a portion of the means for withdrawing the drive element H of the clutch, from the driven element indicated at O. This driven element of the clutch is splined to the clutch shaft D, while the hub $H^2$ rotates freely about the clutch shaft D. Between the hub $H^2$ and the clutch shaft D is a sleeve E. This sleeve E rotates freely about the clutch shaft D, but it is fixed to rotate as indicated by the splines $E^3$ to the hub $H^2$. The hub $H^2$ always rotates with the fly wheel G according to the usual construction and the fly wheel is of course driven by the engine. The sleeve E projects rearwardly beyond the hub $H^2$ and the sleeve at this point carries the sprocket F. The engine is indicated generally at Z in Figure 1. The sprocket wheel F is secured in any appropriate manner to the sleeve E as for instance by the use of a flange $E^2$ on the sleeve to which the sprocket is bolted.

It will be apparent that the electrical machine C will be constantly driven so long as the engine is running. The driving connection is a direct one from the fly wheel through the driving element of the clutch and the dynamo electric machine is therefore not dependent upon the clutch shaft or the driven element of the clutch which do not move when the vehicle is standing or running with the clutch disconnected.

I claim:

In combination with an engine driven flywheel, a clutch behind the fly-wheel composed of driving and driven elements, a clutch shaft made fast to the driven element, a hub loose on the shaft and fixed to the driving element, a sprocket fixed to rotate with said hub, a chain engaging said sprocket, an electrical machine adapted to function both as a generator and as a motor supported in rear of said fly-wheel, a sprocket made fast to said electrical machine and also engaged by said chain, a gear box, and means to support said machine at the side of the gear box.

HENRY MANN AINSWORTH.